(12) United States Patent
Namba et al.

(10) Patent No.: US 10,953,813 B2
(45) Date of Patent: Mar. 23, 2021

(54) IMAGE ACQUISITION DEVICE TO BE USED BY VEHICLE AND VEHICLE PROVIDED WITH SAME

(71) Applicant: KOITO MANUFACTURING CO., LTD., Tokyo (JP)

(72) Inventors: Takanori Namba, Shizuoka (JP); Mitsuharu Mano, Shizuoka (JP); Masayasu Ito, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 67 days.

(21) Appl. No.: 16/065,031

(22) PCT Filed: Dec. 1, 2016

(86) PCT No.: PCT/JP2016/085813
§ 371 (c)(1),
(2) Date: Jun. 21, 2018

(87) PCT Pub. No.: WO2017/110416
PCT Pub. Date: Jun. 29, 2017

(65) Prior Publication Data
US 2019/0016274 A1    Jan. 17, 2019

(30) Foreign Application Priority Data

Dec. 21, 2015 (JP) .............................. JP2015-248825

(51) Int. Cl.
*B60R 11/04* (2006.01)
*G01S 17/89* (2020.01)
(Continued)

(52) U.S. Cl.
CPC ................ *B60R 11/04* (2013.01); *G01C 3/06* (2013.01); *G01S 7/4815* (2013.01); *G01S 17/10* (2013.01);
(Continued)

(58) Field of Classification Search
None
See application file for complete search history.

(56) References Cited

U.S. PATENT DOCUMENTS

| 6,115,511 A | 9/2000 | Sakai et al. |
| 2002/0149694 A1* | 10/2002 | Seo .......................... G01S 7/483 348/370 |

(Continued)

FOREIGN PATENT DOCUMENTS

| CN | 101324749 A | 12/2008 |
| CN | 102737389 A | 10/2012 |

(Continued)

OTHER PUBLICATIONS

Extended European Search Report issued in counterpart European Patent Application No. 16878309.0, dated Jul. 22, 2019 (7 pages).

(Continued)

*Primary Examiner* — Heather R Jones
(74) *Attorney, Agent, or Firm* — Osha Bergman Watanabe & Burton LLP (57) ABSTRACT

A vehicle image acquisition device includes a RGB light source unit having a red light source configured to emit red light, a green light source configured to emit green light, and a blue light source configured to emit blue light, the RGB light source unit being configured to emit respective color light at a predetermined light emission period in a predetermined direction, an image acquisition unit configured to capture reflected light returning from a target distance area at an imaging timing set according to the target distance area, and to acquire a plurality of captured images having different target distance areas, a timing controller configured to control light emission period of the respective color light and the imaging timing; and an image processor configured to combine the captured images each acquired by the respective color light to generate a color image.

4 Claims, 6 Drawing Sheets

(51) Int. Cl.
  *G01S 7/481* (2006.01)
  *G01S 17/18* (2020.01)
  *G01C 3/06* (2006.01)
  *G01S 17/10* (2020.01)
  *H04N 7/18* (2006.01)
  *H04N 9/04* (2006.01)
  *G08G 1/16* (2006.01)

(52) U.S. Cl.
  CPC .............. *G01S 17/18* (2020.01); *G01S 17/89* (2013.01); *G08G 1/16* (2013.01); *H04N 7/18* (2013.01); *H04N 9/04* (2013.01)

(56) References Cited

U.S. PATENT DOCUMENTS

| | | | |
|---|---|---|---|
| 2009/0040500 A1* | 2/2009 | Nishiushi | G01S 7/48 356/3.11 |
| 2012/0075534 A1 | 3/2012 | Katz et al. | |
| 2017/0156673 A1* | 6/2017 | Uchida | G06K 9/2027 |

FOREIGN PATENT DOCUMENTS

| | | |
|---|---|---|
| JP | H08-065690 A | 3/1996 |
| JP | H10-132932 A | 5/1998 |
| JP | 2009-257983 A | 11/2009 |
| JP | 2011-136651 A | 7/2011 |
| JP | 2013-546222 A | 12/2013 |

OTHER PUBLICATIONS

Lin, D. et al.; "Color Range Images Captured by a Four-Phase CMOS Image Sensor"; IEEE Transactions on Electron Devices, vol. 58, No. 3, Mar. 2011, pp. 732-739 (8 pages).

International Search Report issued in PCT/JP2016/085813 dated Feb. 21, 2017 (4 pages).

Written Opinion issued in PCT/JP2016/085813 dated Feb. 21, 2017 (5 pages).

Office Action issued in corresponding Chinese Application No. 201680074554.3; dated Dec. 5, 2019 (14 pages).

* cited by examiner

IMAGE ACQUISITION DEVICE TO BE USED BY VEHICLE AND VEHICLE PROVIDED WITH SAME

CROSS-REFERENCE TO RELATED APPLICATIONS

The present application claims priority to Japanese Patent Application No. 2015-248825 filed on Dec. 21, 2015, the contents of which are incorporated herein by reference in their entirety.

BACKGROUND

Technical Field

The disclosure relates to a vehicle image acquisition device and a vehicle including the vehicle image acquisition device.

Related Art

Patent Document 1 discloses a vehicle image acquisition device that generates distance image data by using a near infrared LED as a projection unit for projecting pulsed light in front of a host vehicle and capturing reflected light at an imaging timing corresponding to the pulsed light.

Patent Document 1: Japanese Patent Laid-Open Publication No. 2009-257983

SUMMARY

A color image cannot be obtained by the distance image data generation device using a near infrared LED as described in Patent Document 1. Therefore, in order to obtain both the distance information and the color image, it was necessary to use the distance image data generation device together with a typical camera or to use both a millimeter wave sensor and a typical camera.

One or more embodiments in the disclosure aims to provide a vehicle image acquisition device capable of obtaining a color image together with distance information by a low-cost configuration and reducing costs, and a vehicle including the same.

According to one or more embodiments of the present invention, a vehicle image acquisition device of the disclosure includes an RGB light source unit having a red light source emitting red light, a green light source emitting green light and a blue light source emitting blue light, and configured to emit respective color light at a predetermined light emission period in a predetermined direction; an image acquisition unit configured to capture reflected light returning from a target distance area at an imaging timing set according to the target distance area and acquire a plurality of captured images having different target distance areas; a timing control unit configured to control light emission period of the respective color light and the imaging timing; and an image processing unit configured to combine the captured images each acquired by the respective color light to generate a color image.

According to the above configuration, with an inexpensive vehicle image acquisition device, a color image can be obtained together with distance information and cost can be reduced. Further, the accuracy of distance detection can be improved by using the RGB light source capable of emitting light having a plurality of different wavelengths.

According to one or more embodiments of the present invention, the timing control unit temporally switches the light emission period of the respective color light and controls the imaging timing according to the light emission period of the respective color light.

According to the above configuration, it is possible to simplify image processing algorithm.

According to one or more embodiments of the present invention, the image processing unit corrects the reflectance of a target to the respective color light by calculating distance information from the captured images of each target distance area acquired from the reflected light of the respective color light and acquires the distance information.

According to the above configuration, it is possible to perform more accurate distance detection.

According to one or more embodiments of the present invention, a vehicle of the disclosure includes the vehicle image acquisition device described above.

According to the above configuration, the vehicle image acquisition device capable of acquiring both the distance information and the color image can be applied to techniques such as automatic driving.

According to one or more embodiments in the disclosure, it is possible to provide the vehicle image acquisition device capable of obtaining a color image together with distance information by a low-cost configuration and reducing costs, and the vehicle including the same.

DETAILED DESCRIPTION

Hereinafter, embodiments of the present invention will be described in detail with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
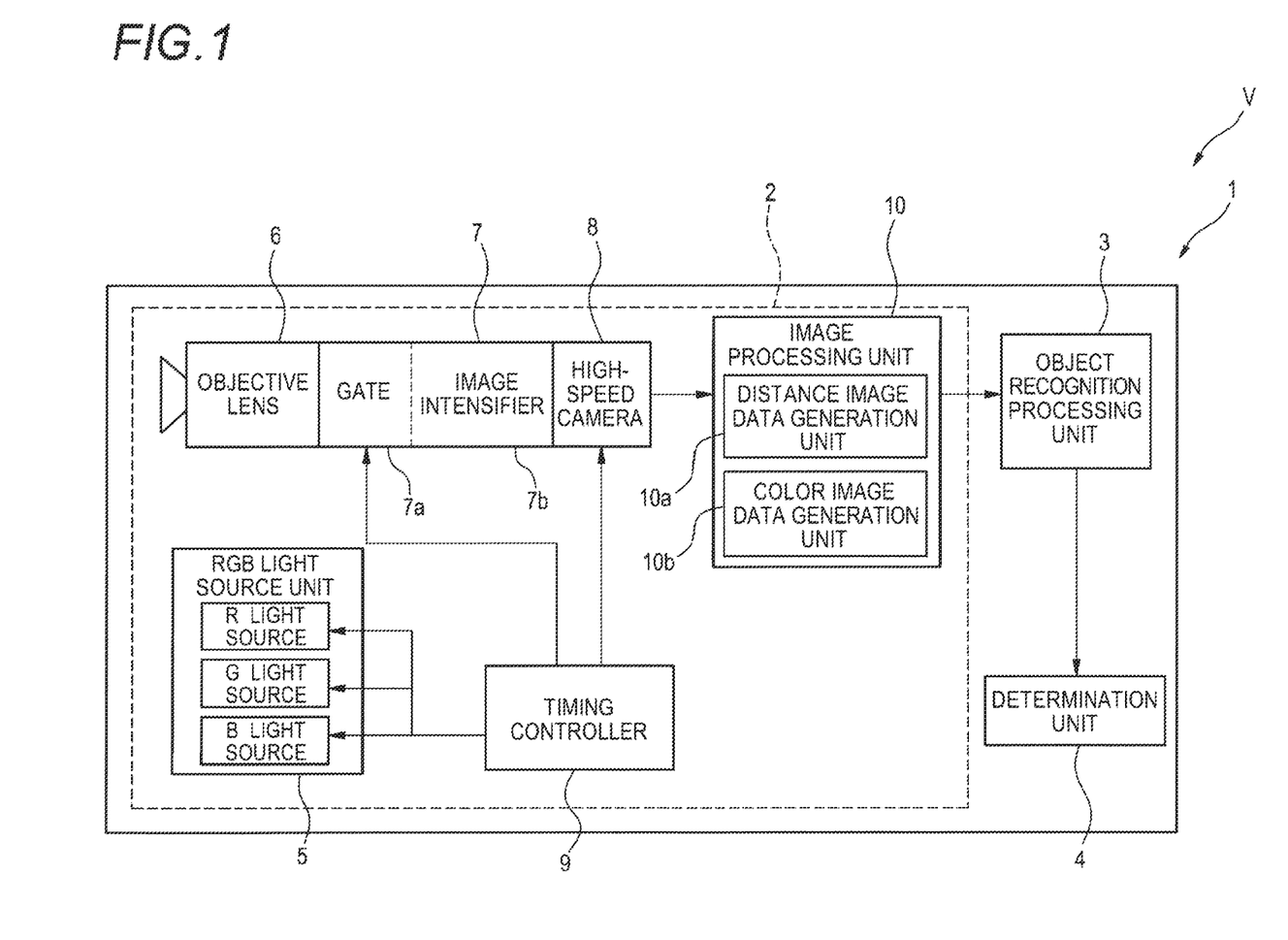
FIG. 1 is a block diagram showing a configuration of an obstacle detection device according to one or more embodiments of the present invention.
Figure 2:
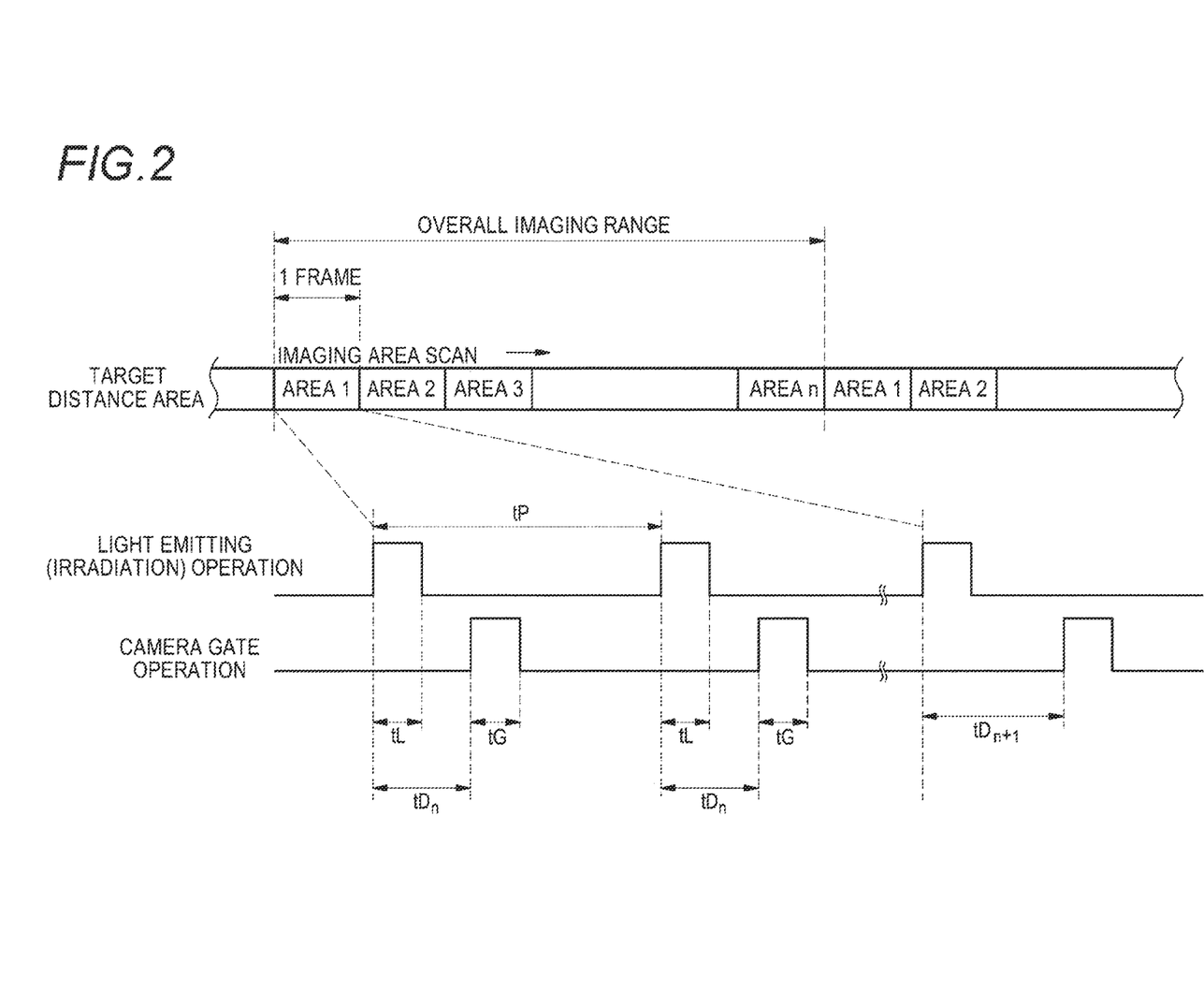
FIG. 2 is a diagram showing a temporal relationship between an operation (light emitting operation) of a light emitting unit and an operation (camera gate operation) of a gate when capturing each target distance area.

FIG. 1 is a block diagram showing a configuration of an obstacle detection device according to one or more embodiments of the present invention, to which a vehicle image acquisition device is applied. FIG. 2 is a schematic diagram showing a temporal relationship between an operation (light emitting operation) of a light emitting unit and an operation (camera gate operation) of a gate when capturing each target distance area.

As shown in FIG. 1, an obstacle detection device 1 provided in a vehicle V (host vehicle) includes an image acquisition device 2, an object recognition processing unit 3, and a determination unit 4.

The image acquisition device 2 includes a RGB light source unit (light emitting unit) 5, an objective lens 6, a light multiplier 7, a high-speed camera (image acquisition unit) 8, a timing controller (timing control unit) 9, and an image processing unit 10.

The RGB light source unit 5 is, for example, a light source disposed on a front end portion (e.g., in left and right headlamps) of the vehicle V and includes a red light source (R light source) emitting red light, a green light source (G light source) emitting green light, and a blue light source (B light source) emitting blue light. In particular, according to one or more embodiments of the present invention, the RGB light source unit 5 is configured by a laser light source that includes a R light source having a red emitting laser diode, a G light source having a green emitting laser diode, and a B light source having a blue emitting laser diode. Meanwhile, the RGB light source unit 5 may be configured by an LED (Light Emitting Diode) or the like capable of emitting each color of RGB.

As shown in FIG. 2, the RGB light source unit 5, respectively, emits red pulsed light, green pulsed light and blue pulsed light in a predetermined direction (e.g., to the front side of the vehicle V) for a predetermined light emission time tL (e.g., 5 ns) in accordance with pulse signal outputted from the timing controller 9. A light emission period tP of each color pulsed light irradiated from the RGB light source unit 5 has, for example, an interval of 10 μs or less.

The objective lens 6 is, for example, an optical system set to have an angle of view capable of capturing a predetermined range in front of the vehicle V and is configured to receive reflected light from an object. The objective lens 6 may be disposed in the vicinity of the RGB light source unit 5 or may be spaced apart from the RGB light source unit 5.

The light multiplier 7 includes a gate 7a and an image intensifier 7b.

The gate 7a is opened and closed in response to an opening/closing command signal from the timing controller 9. In one or more embodiments of the present invention, an opening time (gate time) tG of the gate 7a is set to 5 ns which is the same as the light emission time tL. The gate time tG is proportional to an imaging target length (imaging target depth) of each area (target distance area) in the entire captured area from an area 1 to an area n. As the gate time tG is lengthened, the imaging target length of each area is lengthened. The imaging target length is obtained from light speed×gate time tG. In one or more embodiments of the present invention, since the gate time tG=5 ns, the imaging target length is set to 1.5 m from "light speed (about $3\times10^8$ m/s)×gate time (5 ns)".

The image intensifier 7b is a device for viewing an image with contrast by converting extremely weak light (reflected light from the object, or the like) into electron once, electrically amplifying it, and returning it to a fluorescent image again to multiply the amount of light. The light amplified by the image intensifier 7b is guided to an image sensor of the high-speed camera 8.

As the high-speed camera 8, it is desirable to use a monocular camera without an RGB filter. The high-speed camera 8 captures an image generated from the light multiplier 7 in response to a command signal from the timing controller 9 and outputs the acquired captured image to the image processing unit 10. In one or more embodiments of the present invention, a camera with a resolution of 640×480 (horizontal:vertical), a luminance value of 1 to 255 (256 levels) and 100 fps or more is used.

The timing controller 9 controls imaging timing by setting a delay time tD ($tD_n$ and $tD_{n+1}$ in FIG. 2), which is the time from a light emission start time of each color pulsed light from the RGB light source unit 5 to the opening time of the gate 7a, such that the captured image captured by the high-speed camera 8 becomes the timing of the reflected light returning from a target distance area which is a target captured area, and outputting opening/closing command signal corresponding to the delay time tD. That is, the delay time tD is a value that determines a distance (imaging target distance) from the vehicle V to the target distance area. The relationship between the delay time tD and the imaging target distance is obtained from the following formula (1).

$$\text{Imaging target distance} = \text{light speed (about } 3\times10^8 \text{ m/s)} \times \text{delay time } tD2 \qquad \text{formula (1)}$$

The timing controller 9 changes the imaging range of the high-speed camera 8 to the front side of the vehicle V by increasing the delay time tD by a predetermined interval (e.g., 10 ns) such that the target distance area continuously moves forward (far away) away from the vehicle V. Meanwhile, the timing controller 9 initiates an imaging operation of the high-speed camera 8 immediately before the gate 7a is opened, and terminates the imaging operation after the gate 7a is completely closed.

The timing controller 9 controls the light emitting unit 5, the gate 7a and the high-speed camera 8 so as to perform light emission and exposure multiple times for each of predetermined target distance areas (each area of area 1, area 2, ..., and area n) set in advance. The light received by the high-speed camera 8 is converted into electric charge and accumulated by repeating light emission and exposure multiple times. One captured image obtained every predetermined electric charge accumulation time is called a frame. Meanwhile, the high-speed camera 8 may acquire one captured image (one frame) for each target distance area or may acquire a plurality of captured images (several frames) for each target distance area. In this manner, the high-speed camera 8 acquires a plurality of captured images having different target distance areas and outputs the plurality of captured images acquired to the image processing unit 10.

The image processing unit 10 includes a distance image data generation unit 10a and a color image data generation unit 10b.

Based on the luminance of the same pixel in the captured image of the entire captured area captured by the high-speed camera 8, the distance image data generation unit 10a generates distance image data representing a distance to an object (target) for each pixel and outputs the generated distance image data to the object recognition processing unit 3.

Further, the color image data generation unit 10b generates color image data by combining captured images of each color obtained by capturing reflected light of respective color light from the RGB light source unit 5 by the high-speed camera 8. Then, the color image data generation unit 10b outputs the generated color image data to the object recognition processing unit 3.

The object recognition processing unit 3 specifies an object in the captured image from the distance image data and color image data. A well-known technique such as pattern matching can be used as a method of specifying an object.

The determination unit 4 determines the relationship (distance, direction, etc.) between an object (person, cars, signs, etc.) specified by the object recognition processing unit 3 and a host vehicle (vehicle V).

Next, an image acquisition operation according to one or more embodiments of the present invention will be described.

[Image Acquisition Operation]

The timing controller 9 sets the delay time tD and controls the imaging timing of the high-speed camera 8 such that the captured image captured by the high-speed camera 8 becomes the timing of reflected light returning from a predetermined target distance area. When an object is present in the target distance area, the time the light emitted from the RGB light source unit 5 returns from the target distance area corresponds to the time the light reciprocates a distance (imaging target distance) between the vehicle V and the target distance area. In this manner, the delay time tD can be obtained from the imaging target distance and the light speed.

When an object is present in the target distance area, the luminance value data of a pixel corresponding to the position of the object in the captured image of the high-speed camera 8 obtained by the above method is influenced by the reflected light and represents a value higher than the luminance value data of another pixel. In this manner, the distance to the object present in the target distance area can be obtained on the basis of the luminance value data of each pixel.

Figure 3:
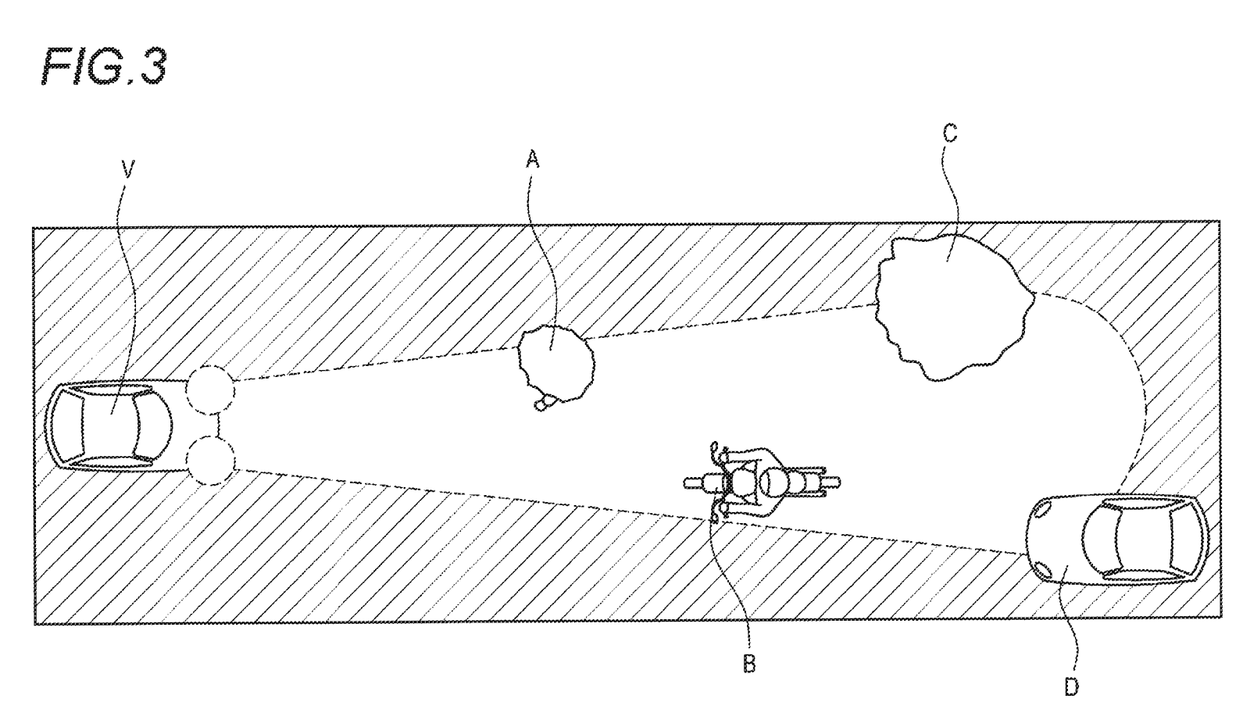
FIG. 3 is a view showing a situation where four different objects are present at different positions in front of a host vehicle.

FIG. 3 shows a situation where four objects A to D are present at different positions in front of the vehicle V. The object A is a person holding an umbrella, the object B is a motorcycle on the opposite lane side, the object C is a tree on the sidewalk side, and the object D is a vehicle (oncoming vehicle) on the opposite lane side. The distance relationship between the vehicle V and each object is set to A<B<C<D.

Figure 4:
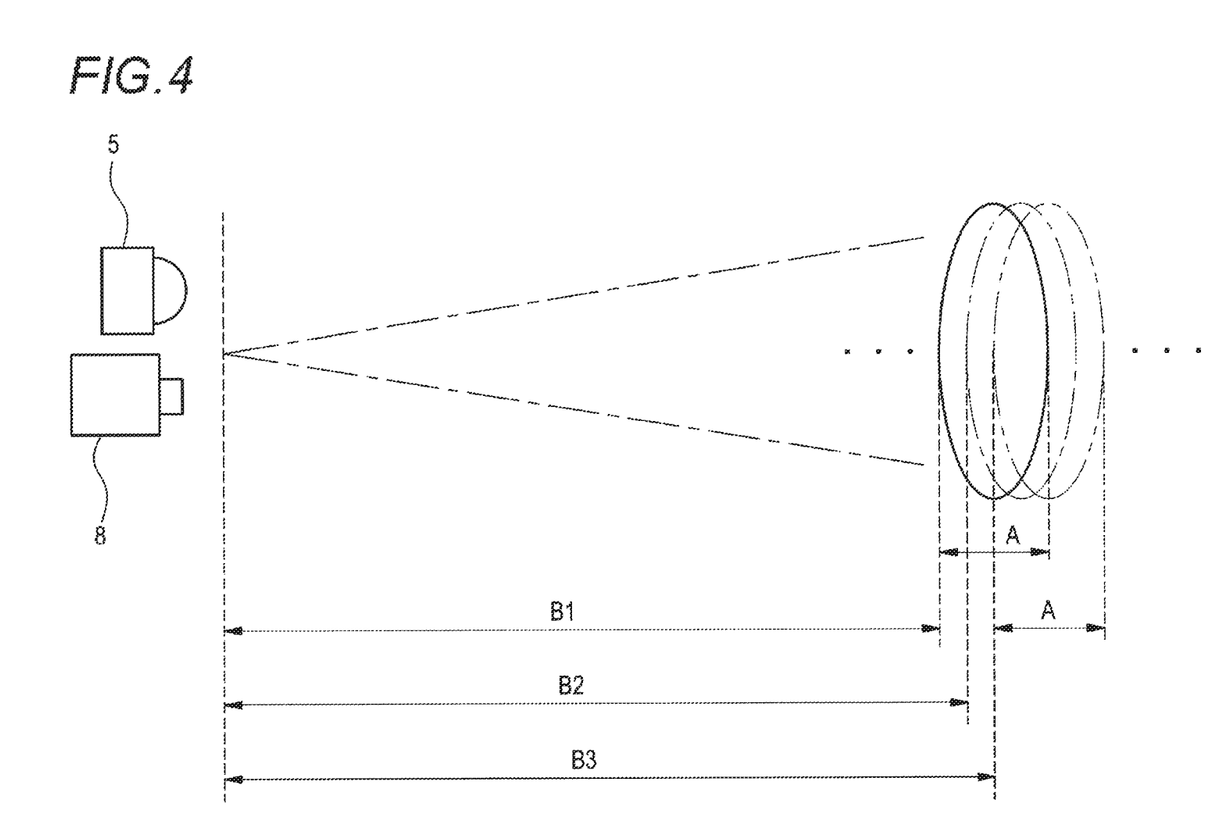
FIG. 4 is a view showing a state in which captured areas are partially overlapped.

At this time, in one or more embodiments of the present invention, the captured areas are partially overlapped such that the reflected light from one object is reflected on the pixels of the captured images in a plurality of continuous captured areas. That is, as shown in FIG. 4, the increase amount (B2−B1) of the imaging target distance is made shorter than the imaging target length A of the captured area when imaging is performed while continuously changing the imaging target distance as B1→B2→B3→ . . . . Thus, the increase amount of the imaging target distance is set such that the captured areas are partially changed while overlapping.

Figure 5:
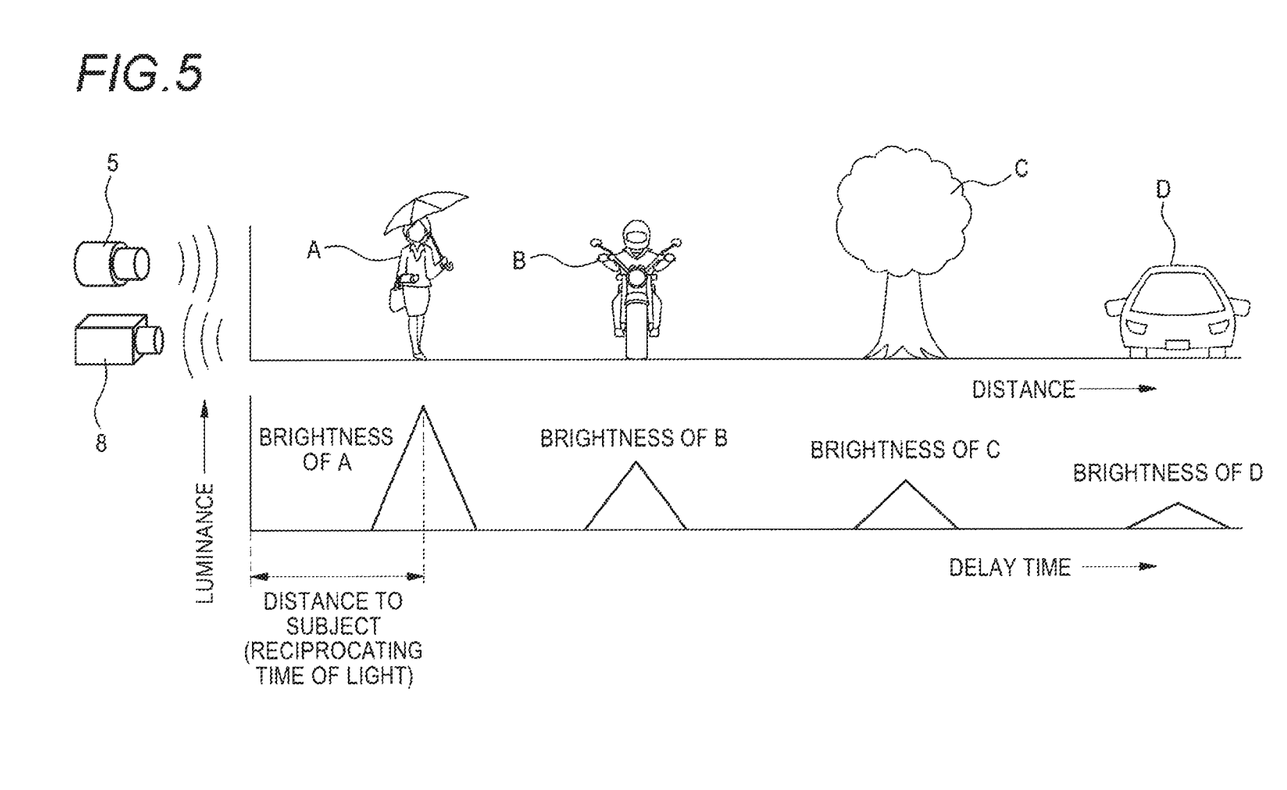
FIG. 5 is a schematic view showing temporal luminance changes of pixels corresponding to each object.

FIG. 5 is a schematic view showing temporal luminance changes of pixels corresponding to each object.

As shown in FIG. 5, when the captured areas are partially overlapped, the luminance value of the same pixel in a plurality of continuous captured images represents a triangular waveform characteristic in which the luminance value gradually increases, reaches the peak at the position of each object A to D and then gradually decreases. In this manner, the temporal luminance change of the pixel represents a triangular waveform shape when the reflected light from one object is included in a plurality of captured images. Therefore, the captured areas corresponding to the peaks of the triangular waveform shape are set to the distances from the vehicle V to each object (subject) A to D in the pixels, so that the detection accuracy can be enhanced.

Figure 6A:
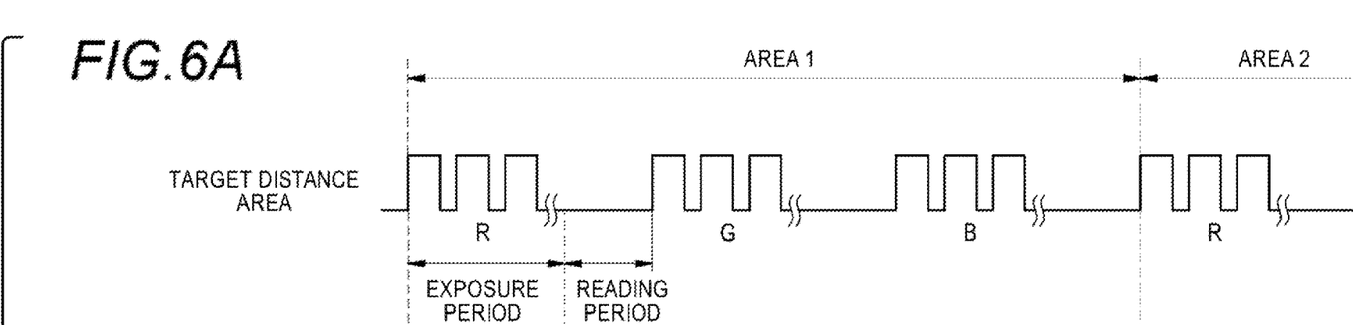
FIGS. 6A and 6B are views for explaining camera operation timing according to one or more embodiments of the present invention.
Figure 6B:
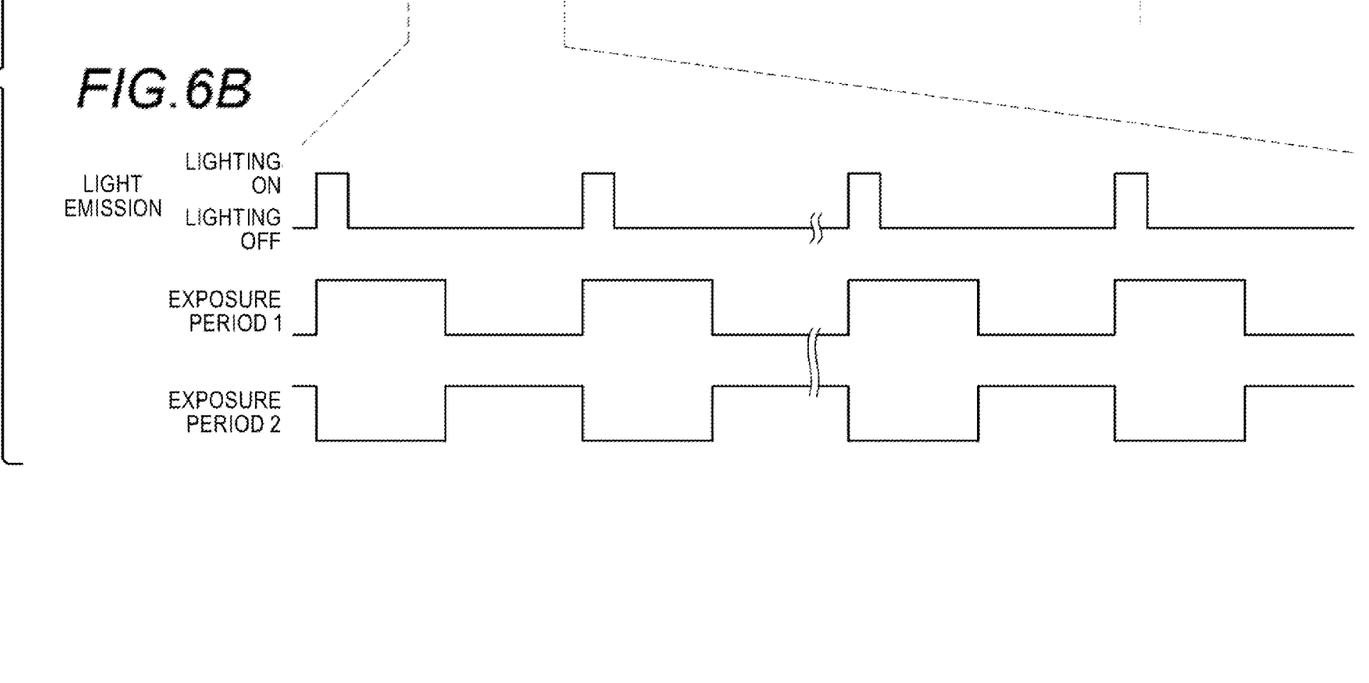

FIGS. 6A and 6B are views for explaining camera operation timing according to one or more embodiments of the present invention.

In one or more embodiments of the present invention, as shown in FIG. 6A, the timing controller 9 controls the light emitting unit 5 such that light emission period of respective color light for each target distance area (e.g., area 1) is temporally switched. That is, when imaging the area 1, first, the timing controller 9 makes the red light source emit red pulsed light in a predetermined light emission period and performs exposure (gate opening/closing operation) at an imaging timing corresponding to the light emission period of the red pulsed light. That is, the timing controller 9 performs light emission and exposure of the red pulsed light multiple times and acquires a captured image (1 frame or several frames) of the area 1 by the red pulsed light. Then, a constant readout period is provided, and the timing controller 9 outputs an image processing command signal of the captured image of the area 1 by the red pulsed light to the image processing unit 10 (the distance image data generation unit 10*a* and the color image data generation unit 10*b*) within the readout period. Subsequently, the timing controller 9 makes the green light source emit green pulsed light in a predetermined light emission period and performs exposure at an imaging timing corresponding to the light emission period of the green pulsed light. Then, a constant readout period is provided, and the timing controller 9 outputs an image processing command signal of the captured image (1 frame or several frames) of the area 1 by the green pulsed light to the image processing unit 10 within the readout period. Subsequently, the timing controller 9 makes the blue light source emit blue pulsed light in a predetermined light emission period and performs exposure at an imaging timing corresponding to the light emission period of the blue pulsed light. Then, a constant readout period is provided, and the timing controller 9 outputs an image processing command signal of the captured image (1 frame or several frames) of the area 1 by the blue pulsed light to the image processing unit 10 within the readout period.

In this manner, the light emission and exposure of the respective color light are performed multiple times in such a manner to be temporally switched, so that the captured images obtained by capturing the reflected light of the respective color light to the area 1 are acquired, respectively. One captured image (one frame) may be acquired for each RGB light or a plurality of captured images (several frames) may be acquired for each light. Then, by performing imaging in such a manner to temporally switch the light emission period of respective color light in each target distance area from the area 2 to the area n, the captured images based on the respective color light are acquired for each area, respectively.

Since the spectral reflectance differs depending on the object, in the captured images captured by light having low intensity of the reflected light out of the RGB light, the S/N ratio is deteriorated and the ranging accuracy is also lowered. Therefore, in one or more embodiments of the present invention, by utilizing the fact that the spectral reflectance differs depending on the object, the image processing unit 10 performs arithmetic processing on the distance information obtained from the captured images by the respective color light of the RGB and corrects the spectral reflectance of the object to the respective color light by the reflectance of color light having high intensity of the reflected light from the object out of the RGB light. In this manner, it is possible to further improve the distance detection accuracy.

Further, the color image data generation unit 10*b* generates color image data by combining a red image obtained by emission and exposure of red pulsed light, a green image obtained by emission and exposure of green pulsed light, and a blue image obtained by emission and exposure of blue pulsed light. The distance image data generated by the distance image data generation unit 10a and the color image data generated by the color image data generation unit 10b may be separately outputted to the object recognition processing unit 3, or the combined image data of the distance image data and the color image data combined in the image processing unit 10 may be outputted to the object recognition processing unit 3.

Meanwhile, after acquiring the captured image obtained by capturing reflected light of the respective color light to the target distance area, one or more embodiments of the present invention adopts a charge distribution method in order to calculate a distance to the object included in the captured image. In this method, the charges obtained by exposure of reflected light from the object are distributed as signal charges having different phases into predetermined accumulation areas provided in the high-speed camera 8. The distributed signal charges are accumulated in the corresponding signal charge accumulation areas, respectively. The signal charges accumulated in the signal charge accumulation areas are read out as outputs corresponding to the accumulated charge amounts, and the distance to the target is calculated on the basis of the ratio of these outputs. For example, as shown in FIG. 6B, the timing controller 9 performs exposure control such that the reflected light from the object with respect to one-time light emission of the pulsed light is exposed in both an exposure period 1 of a certain cycle and an exposure period 2 having phase cycle different from the exposure period 1. The distance from the vehicle V to the object can be calculated by utilizing the ratio between the charge amount accumulated in the exposure period 1 and the charge amount accumulated in the exposure period 2.

According to the image acquisition device 2 of one or more embodiments of the present invention described above, one or more of the following effects can be obtained.

(1) Respective color light is emitted from the RGB light source unit 5 that includes the red light source emitting red light, the green light source emitting green light and the blue light source emitting blue light. Reflected light of the respective color light is captured by the high-speed camera 8 which is, for example, a monocular camera to acquire a plurality of captured images having different target distance areas. The captured images each acquired by the respective color light in the image processing unit 10 (the color image data generation unit 10b) are combined. In this manner, the color image data is generated. According to this configuration, the vehicle image acquisition device 2 of one or more embodiments of the present invention can obtain a combined color image in addition to a captured image having distance information by using an inexpensive monocular camera without an RGB filter. Therefore, it is possible to significantly reduce the cost of a driving support system which was realized by a millimeter wave radar/stereo camera fusion sensor or the like using both a millimeter wave radar and a stereo camera as in the prior art. Further, since the RGB light source unit capable of emitting light having a plurality of different wavelengths is used as the light emitting unit emitting pulsed light, it is possible to improve the distance detection accuracy (ranging accuracy).

Meanwhile, the obstacle detection device 1 including the image acquisition device 2 according to one or more of the above embodiments can be suitably used for controlling the light distribution of so-called AHB (automatic high beam) system or ADB (adaptive driving beam) system. For example, the distance information can be acquired from a plurality of captured images having different target distance areas obtained in the image acquisition device 2 and the target information can be acquired from the combined color image, so that it can be determined whether the object is a vehicle or not. In this manner, the distance information and the target information, which have been obtained by using both a millimeter wave radar and a camera, can be obtained only by the image acquisition device 2, so that the light distribution control of the AHB system or the ADB system can be performed at a lower cost.

(2) The timing controller 9 temporally switches the light emission period of the respective color light and controls the imaging timing according to the light emission period of the respective color light. According to this configuration, it is possible to simplify image processing algorithm.

(3) According to one or more embodiments of the present invention, the image processing unit 10 corrects the reflectance of a target (object) to the respective color light by calculating the captured image of each target distance area and acquires the distance information. According to this configuration, a more accurate distance image can be obtained by correcting the spectral reflectance of the target.

Although embodiments of the present invention have been described with reference to the examples, the specific configurations of the disclosure are not limited to the configurations of the examples. Design changes and addition and the like are permitted so long as they do not depart from the gist of the disclosure according to each claim of the claims.

For example, the imaging target length, the amount of change in the imaging target distance, and the number of frames for each target distance area, and the like can be suitably set according to the performance of the high-speed camera 8 and the image processing unit 10.

In the one or more of the above embodiments, as shown in FIG. 1, the high-speed camera 8 is configured to function as the image acquisition unit, but the disclosure is not limited to this example. For example, the image processing unit 10 may function as the image acquisition unit. Alternatively, a separate memory as the image acquisition unit for storing the captured images may be provided between the high-speed camera 8 and the image processing unit 10.

In one or more of the above embodiments, as shown in FIG. 1, the light multiplier 7 (the gate 7a and the image intensifier 7b) is provided between the objective lens 6 and the high-speed camera 8, but the disclosure is not limited to this example. For example, it is also possible to acquire a plurality of captured images by performing gating at a predetermined imaging timing within the high-speed camera 8 without providing the light multiplier 7.

In one or more of the above embodiments, the object recognition is performed by generating the distance image data by the image processing unit 10. However, the object recognition may be performed from the captured images of the respective target distances captured by the high-speed camera 8.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A vehicle image acquisition device comprising:
a RGB light source unit having a red light source configured to emit red light, a green light source configured to emit green light, and a blue light source configured to emit blue light;
an image acquisition unit configured to capture reflected light returning from a target distance area which is defined as a plurality of divided areas of a captured area at an imaging timing set according to the target distance area, and to acquire a plurality of captured images having different target distance areas;
a timing controller configured to control light emission timing and the imaging timing; and
an image processor configured to combine the captured images each acquired by the respective color light to generate a color image,
wherein, for each target distance area, the RGB light source unit emits light of different colors in sequence,
wherein, for each color, the sequence comprises: a light emission period during which light of the color is emitted; and a constant readout period during which the timing controller outputs an image processing command signal of the captured image of the target distance area, and
wherein the image processor is configured to calculate distance information from the captured images of each target distance area acquired from the reflected light of the respective color light and acquire the distance information.

2. The vehicle image acquisition device according to claim 1,
wherein the timing controller temporally switches the light emission period of the respective color light and controls the imaging timing according to the light emission period of the respective color light.

3. The vehicle image acquisition device according to claim 1,
wherein the image processor corrects the reflectance of a target to the respective color light by calculating distance information from the captured images of each target distance area acquired from the reflected light of the respective color light and acquires the distance information.

4. A vehicle comprising the vehicle image acquisition device according to claim 1.

* * * * *